Sept. 23, 1969     P. M. DUNLAP ET AL     3,468,377

WATERFLOODING EMPLOYING SURFACTANT SOLUTION

Filed Oct. 9, 1967     2 Sheets-Sheet 1

INVENTORS
PEGGY M. DUNLAP
WILLIAM R. FOSTER

Frederick E. Dumoulin

ATTORNEY

FIG. 3a

FIG. 3b 3,468,377
WATERFLOODING EMPLOYING SURFACTANT
SOLUTION
Peggy M. Dunlap and William R. Foster, Dallas, Tex.,
assignors to Mobil Oil Corporation, a corporation of
New York
Filed Oct. 9, 1967, Ser. No. 673,686
Int. Cl. E21b 43/20
U.S. Cl. 166—274                    19 Claims

ABSTRACT OF THE DISCLOSURE

This specification discloses a method of waterflooding to recover oil from a subterranean formation. The method comprises injecting into the formation a solution of a mixture of petroleum sulfonates having a median molecular weight of from about 375 to about 430, having molecular weights from 290 to 590, no more than 10 percent by weight thereof having an average molecular weight less than 290, and no more than 15 percent by weight thereof having an average molecular weight greater than 590. It is particularly preferred to employ a restricted mixture of petroleum sulfonates having a median molecular weight of from about 400 to about 430, and having a smooth monomodal curve of molecular weight distribution between average molecular weights of about 290 and 590. The solution may be aqueous or hydrocarbonaceous. Preferably, the mixture of petroleum sulfonates is injected in an aqueous solution which also contains sodium chloride, sodium carbonate, and inorganic polyphosphates.

BACKGROUND OF THE INVENTION

This invention relates to the recovery of petroleum from a subterranean formation. More particularly, the invention relates to the recovery of petroleum contained in a subterranean formation by flooding the formation with water.

The petroleum, more commonly called crude oil or simply oil, accumulated in subterranean formations is recovered or produced therefrom through wells drilled into the subterranean formations. A large amount of the oil is left in the subterranean formations if produced only by primary depletion, i.e., where only initial formation energy is used to recover the oil. Where the initial formation energy is inadequate or has become depleted, supplemental operations are employed. These supplemental operations are often referred to as secondary recovery operations although, in fact, they may be primary or tertiary in sequence of their employment.

In a successful and widely used supplemental operation, a fluid is injected through injection means, comprising one or more injection wells, and passed into the formation. Oil is displaced within and is moved through the formation, and is produced through production means, comprising one or more production wells, as the injected fluid passes from the injection means toward the production means. In a particular recovery operation of this sort, water is employed as the injected fluid and the operation is referred to as a waterflood. The injected water is referred to as the flooding water, as distinguished from the in-situ, or connate, water.

Waterflooding is a useful method of supplementing recovery of oil from subterranean formations. It has, however, a relatively poor microscopic displacement efficiency. The microscopic displacement efficiency may be defined as the ratio of the amount of oil displaced from the pore space of the portion of the formation through which the water has passed to the original amount of oil therein. The relatively poor microscopic displacement is due to the property of immiscibility which the water, as the flooding liquid, has with the oil it seeks to displace. There is a relatively high interfacial tension between the water and the oil. The interface between the two liquids is an interfacial zone analogous to a film that, because of appreciable interfacial tension, is prevented from moving through the micropores to displace the oil therefrom. Regardless, there is a relationship between the microscopic displacement efficiency of a flooding water and the interfacial tension between the flooding water and the oil it seeks to displace, the displacement efficiency decreasing with increasing interfacial tension.

Typically, the interfacial tension between an aqueous phase, such as flooding water or aqueous solutions, and a hydrocarbonaceous phase, such as oil or hydrocarbonaceous solutions, may range from about 5 to about 50 dynes per centimeter. Surfactants have been used in waterflooding to reduce the interfacial tension. However, the surfactants commercially available have enabled, when used in practical amounts, lowering this interfacial tension down to only about 0.03 dyne per centimeter. For example, U.S. Patent 3,302,713, issued Feb. 7, 1967, to Ahearn et al., describes and claims using, as surfactants, petroleum sulfonates that: (1) effect an interfacial tension of 0.03 dyne per centimeter, (2) are prepared by sulfonating at least a portion of sulfonatable constituents which occur in the 700–1100° F. boiling range, and (3) have an average molecular weight between 452 and 702. However, an even lower interfacial tension between the flooding water and the oil in the formation would be more effective for displacing the oil from the formation. On the other hand, as the interfacial tension gets much below about 0.03 dyne per centimeter, further decreases are difficult to achieve.

In connection with the use of surfactants in waterflooding, the surfactants often have not created the most favorable contact angle between the flooding water and the oil in the formation. The contact angle is the angle at which the interface between the water and the oil contacts the solid surfaces of the formation. Desirably, the contact angle should be as close to 180 degrees, measured through the oil, as possible for best results in recovering the oil.

SUMMARY OF THE INVENTION

The invention provides an improvement in the method of recovering oil from an oil-containing subterranean formation in which a surfactant solution and flooding water are injected through an injection well into the subterranean formation and oil is produced through a production well from the subterranean formation to the surface of the earth. The improvement comprises injecting into the formation a solution containing, as surfactant, a mixture of petroleum sulfonates having a median molecular weight of from about 375 to about 430, having molecular weights from 290 to 590, no more than 10 percent by weight thereof having an average molecular weight less than 290, and no more than 15 percent by weight thereof having an average molecular weight greater than 590. The term "the restricted petroleum sulfonates" is employed herein to identify the petroleum sulfonates restricted to the above description. A preferred group of the petroleum sulfonates are petroleum sulfonates further restricted such that their median molecular weight is from about 400 to about 430. The term "the preferred restricted petroleum sulfonates" is employed herein to identify the further restricted petroleum sulfonates. Preferably, the solution contains the restricted petroleum sulfonates in a concentration sufficient to effect an interfacial tension between the flooding water and the oil of less than 0.01 dyne per centimeter. The solution may be aqueous or hydrocarbonaceous. Where the solution is aqueous, it preferably contains sodium chloride, sodium carbonate, and inorganic polyphosphates.

The molecular weights referred to above and hereinafter are the molecular weights of the sodium salts of the petroleum sulfonates. Moreover, the term "molecular weight" should be understood to mean equivalent weight, which is defined as molecular weight per sulfonate group. The term "molecular weight" is used because it is commonly applied by manufacturers of petroleum sulfonates in describing their products.

DESCRIPTION OF SPECIFIC EMBODIMENTS

In employing the invention, a slug of solution of the restricted petroleum sulfonates is injected through an injection well and into a subterranean formation. Thereafter, flooding water is injected through an injection well and into the subterranean formation to displace the oil within the subterranean formation and move it, and the surfactant solution, toward a production means. The oil is produced from the production means to the surface of the earth. By employing the restricted petroleum sulfonates in the solution, the restricted petroleum sulfonates are introduced into the interfacial zone in the subterranean formation between the oil in the formation and the flooding water, achieving an interfacial tension lower than has been possible heretofore. In this way, there is effected very nearly complete microscopic displacement of the oil from the portion of the formation through which the solution and the flooding water pass.

The restricted petroleum sulfonates may be introduced into the interfacial zone in the subterranean formation from either a hydrocarbonaceous phase, an aqueous phase, or both. For example, the restricted petroleum sulfonates may be injected into the formation in solution in a hydrocarbonaceous liquid and will enter into the interfacial zone from the hydrocarbonaceous solution. On the other hand, the restricted petroleum sulfonates may be injected into the formation in aqueous solution and will enter the interfacial zone from the aqueous solution. The restricted petroleum sulfonates may also be injected into the formation in a hydrocarbonaceous solution and in aqueous solution, both the solutions being injected respectively into the subterranean formation. In this way, the restricted petroleum sulfonates will enter the interfacial zone from both the hydrocarbonaceous solution and the aqueous solution. This latter method of introducing the restricted petroleum sulfonates produces particularly low interfacial tensions.

In a specific embodiment of the invention, as mentioned previously, where the restricted petroleum sulfonates are injected into a formation in aqueous solution, the solution will also contain sodium chloride, sodium carbonate, and a soluble inorganic polyphosphate such as sodium tripolyphosphate or tetrasodium pyrophosphate. The addition to the aqueous solution of these salts usually results in the attainment of a lower interfacial tension and a greater degree of water wettability in the interfacial zone. Particularly low interfacial tensions are attained where an aqueous solution of the restricted petroleum sulfonates containing sodium chloride, sodium carbonate, and a soluble inorganic polyphosphate is employed along with a hydrocarbonaceous solution of the restricted petroleum sulfonates.

Determination of molecular weights of petroleum sulfonates and the use of molecular weight distribution to characterize particular petroleum sulfonate mixtures are well known. The method employed for estimation of molecular weight distribution of the petroleum sulfonates described herein is that set forth in the publication "Estimation of Molecular Weight Distribution of Oil-Soluble Sulfonates" by Feldman and Hill. This publication is available upon request from the Division of Petroleum Chemistry, American Chemical Society. An abstract of the paper was published in Abstract of Papers Presented Before The 136th Meeting of The Division of Petroleum Chemistry, American Chemical Society at the Atlantic City Meeting, Sept. 13–18, 1959.

Figure 3A:
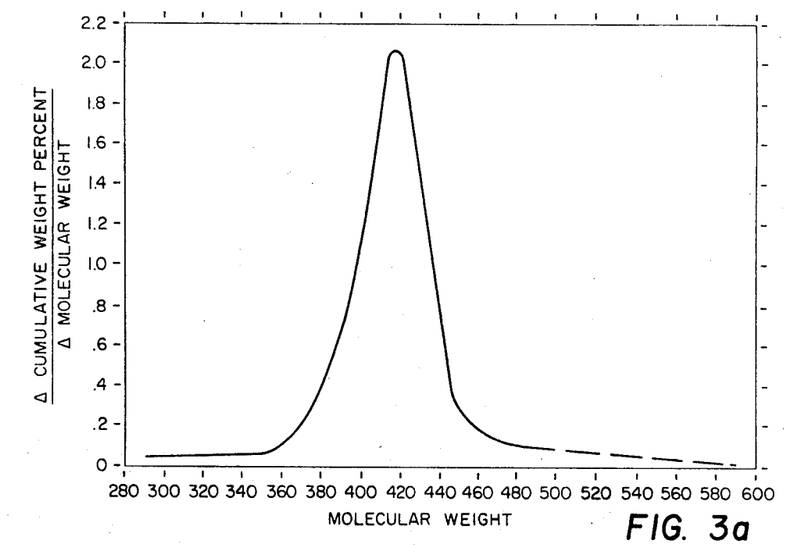
FIGURE 3a is a frequency distribution graph illustrating a differential molecular weight distribution for a specific example of the restricted petroleum sulfonates.

Preferably, the restricted petroleum sulfonates which are employed are those characterized by having a frequency distribution of molecular weight which in the form of a graph of differential molecular weight distribution is a smooth, monomodal curve between average molecular weights of 290 and 590. A frequency distribution graph is a well-known method of portraying the relative amount in a mixture of a component having a particular characteristic such as molecular weight. An illustrative frequency distribution graph for a preferred embodiment of the restricted petroleum sulfonates is shown in FIGURE 3a and will be discussed further in connection with that figure.

The restricted petroleum sulfonates are also characterized in that they have a ratio $(M_{100}-M_0)/M_{50}$ between 0.5 and 0.9; where:

$M_{100}$ is the minimum molecular weight at which 100 percent cumulative weight distribution exists, $M_0$ is the maximum molecular weight at which 0 percent cumulative weight distribution exists, and $M_{50}$ is the molecular weight at which 50 percent cumulative weight distribution exists.

Figure 3B:
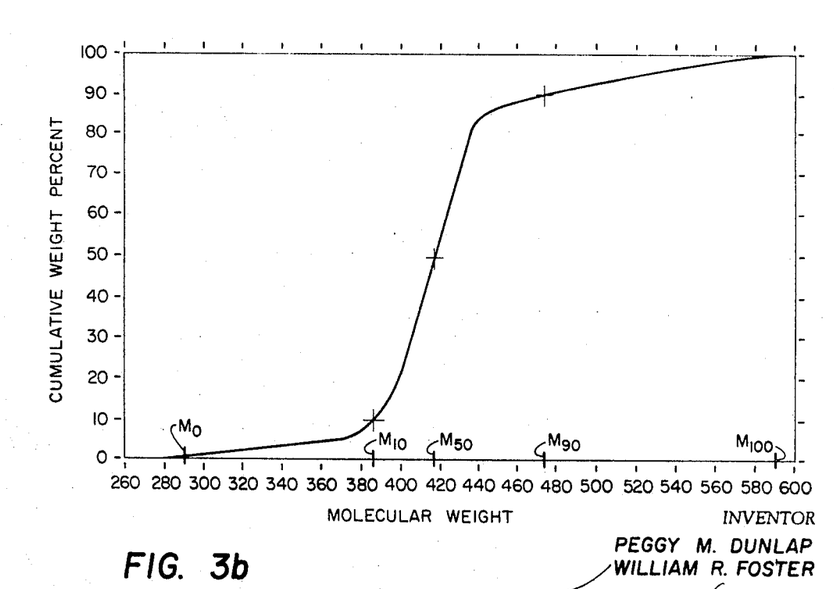
FIGURE 3b is a graph illustrating the molecular weight distribution for the same restricted petroleum sulfonates of FIGURE 3a plotted as cumulative molecular weight distribution.

A cumulative distribution of molecular weights is illustrated in FIGURE 3b and will be discussed further in connection with that figure. FIGURE 3b has marked thereon $M_0$, $M_{10}$, $M_{50}$, $M_{90}$, and $M_{100}$. Preferred restricted petroleum sulfonates have a ratio $(M_{100}-M_0)/M_{50} \cong 0.7$.

The restricted petroleum sulfonates also have a ratio $(M_{90}-M_{10})/M_{50}$ between 0.15 and 0.35; where:

$M_{90}$ is the molecular weight at which 90 percent cumulative weight distribution exists, $M_{10}$ is the molecular weight at which 10 percent cumulative weight distribution exists, and $M_{50}$ is the molecular weight at which 50 percent cumulative weight distribution exists.

Preferred restricted petroleum sulfonates have a ratio $(M_{90}-M_{10})/M_{50}$ of from 0.25 to 0.3.

The petroleum sulfonates employed in the practice of the invention include natural petroleum sulfonates and synthetic petroleum sulfonates. Natural petroleum sulfonates are prepared by sulfonating fractions from a crude oil or refinery stream. Synthetic petroleum sulfonates are prepared by sulfonating alkyl aryl fractions synthesized in various chemical operations, including petrochemical operations, such as the alkylation of benzene with propylene tetramer. The sulfonation reaction is essentially the same whether natural petroleum sulfonates or synthetic petroleum sulfonates are to be prepared. The sulfonation may be carried out employing concentrated sulfuric acid, oleum, sulfur trioxide, or chlorosulfonic acid. Reference for procedures for the production of petroleum sulfonates is made to the Encyclopedia of Chemical Technology, Kirk-Othmer, edited by Raymond E. Kirk and Donald F. Othmer, the Interscience Encyclopedia Inc., New York, 1954, volume 13, pages 327–331, specifically pages 330 and 331.

The restricted petroleum sulfonates may be employed in the acid form or in the form of a salt. The acid form is corrosive. Accordingly, the restricted petroluem sulfonates generally will be employed in the form of a neutral salt. Ordinarily, the restricted petroleum sulfonates will be employed in the form of the sodium salt. However, they may be employed in the form of salts other than the sodium salt. Where the restricted petroleum sulfonates are employed in other than the sodium form, the molecular weights of the form employed will be those corresponding to the sodium form.

The restricted petroleum sulfonates may be prepared by sulfonating a selected fraction of a petroleum stock or synthesized alkyl aryl stock, or they may be prepared by admixing, in proper proportions, commercially available petroleum sulfonates, natural or synthetic. As an example of the latter method, and as a specific embodiment of the invention, the restricted petroleum sulfonates may be obtained by admixing commercially available higher molecular weight petroleum sulfonates with commercially available lower molecular weight petroleum sulfonates. More specifically, commercially available petroleum sulfonates in the sodium form having molecular weights as high as 590 and having a median molecular weight of from about 410 to about 450 can be admixed with commercially available petroleum sulfonates in the sodium form having molecular weights as low as 290 and having a median molecular weight of from about 340 to about 380. Illustrative of commercially available lower molecular weight petroleum sulfonates that may be used in the practice of this invention is Pyronate 50. Illustrative of commercially available higher molecular weight petroleum sulfonates that may be employed in the practice of this invention are Alconate 80, Petronate L, and Bryton 430. Pyronate 50 contains about 50 percent petroleum sulfonates. Alconate 80 contains about 80 percent petroleum sulfonates. Petronate L contains about 62 percent petroleum sulfonates. Bryton 430 contains about 62 percent petroleum sulfonates.

Tables I, II, III, and IV show the molecular weight distribution of the sodium salt of the petroleum sulfonates in Pyronate 50, Alconate 80, Petronate L, and Bryton 430. In these tables, the analysis is based on petroleum sulfonates only. The analysis can be converted to the percent by weight of the total composition simply by multiplying by the percent of the petroluem sulfonates in the commercial product as given in the paragraph above. The percent shown for a given molecular weight represents the proportion of the petroleum sulfonates having molecular weights averaging about the given molecular weight. The percent shown for the portion of the petroleum sulfonates having the lowest molecular weight includes an accumulation of all petroleum sulfonates having a molecular weight less than this lowest molecular weight. Similarly, the highest molecular weight portion includes an accumulation of all petroleum sulfonates having a molecular weight more than this highest molecular weight.

Pyronate 50, Alconate 80, and Petronate L are available from the Witco Chemical Company, Sonneborn Division, 3334 Richmond Avenue, P.O. Box 22443, Houston, Tex. 77027. Bryton 430 is commercially available from Continental Oil Company or Bryton Chemical Company, No. 9, Rockefeller Plaza, New York, N.Y. 10020.

TABLE I

Molecular weight distribution of (sodium) petroleum sulfonates in Pyronate 50

| Molecular weight: | Petroleum sulfonates only (percent by weight) |
|---|---|
| 289 | 7.4 |
| 296 | 9.5 |
| 302 | 2.3 |
| 311 | 3.8 |
| 322 | 16.5 |
| 344 | 9.3 |
| 361 | 12.0 |
| 414 | 32.1 |
| 438 | 7.1 |

Average molecular weight, 360.
Median molecular weight, 346.

TABLE II

Molecular weight distribution of (sodium) petroleum sulfonates in Alconate 80

| Molecular weight: | Petroleum sulfonates only (percent by weight) |
|---|---|
| 373 | 6.5 |
| 400 | 3.1 |
| 404 | 15.4 |
| 413 | 10.0 |
| 420 | 18.9 |
| 433 | 13.3 |
| 437 | 16.1 |
| 459 | 3.8 |
| 587 | 12.9 |

Average molecular weight, 440.
Median molecular weight, 418.

TABLE III

Molecular weight distribution of (sodium) petroleum sulfonates in Petronate L

| Molecular weight: | Petroleum sulfonates only (percent by weight) |
|---|---|
| 350 | 9.6 |
| 390 | 3.5 |
| 401 | 15.4 |
| 416 | 10.1 |
| 423 | 17.4 |
| 437 | 11.8 |
| 444 | 14.9 |
| 523 | 3.8 |
| 577 | 13.5 |

Average molecular weight, 440.
Median molecular weight, 421.

TABLE IV

Molecular weight distribution of (sodium) petroleum sulfonates in Bryton 430

| Molecular weight: | Petroleum sulfonates only (percent by weight) |
|---|---|
| 356 | 7.5 |
| 410 | 14.9 |
| 413 | 3.2 |
| 425 | 10.2 |
| 427 | 17.9 |
| 449 | 15.4 |
| 458 | 12.4 |
| 513 | 4.1 |
| 570 | 14.6 |

Average molecular weight, 450.
Median molecular weight, 427.

The restricted petroleum sulfonates are dissolved in water or in a hydrocarbon to prepare the aqueous solution or the hydrocarbonaceous solution, respectively. In some instances, the restricted petroleum sulfonates do not truly dissolve in water. Rather, they may only disperse in the water. However, the fact that the restricted petroleum sulfonates may only disperse in water does not preclude the use of the dispersion in the practice of the invention so long as the resulting dispersion does not form a filter cake when injected into the subterranean formation. The hydrocarbon employed as the solvent for preparing the hydrocarbonaceous solution are those which are liquid at the temperature and pressure of the subterranean formation. Suitable hydrocarbons include crude oil, gas oil, kerosine, gasoline, distillate, and sometimes liquefied petroleum gases. Ordinarily, hydrocarbons which boil at atmospheric pressure within the range of from about 300° F. to about 1000° F. are preferred as solvents.

When the restricted petroleum sulfonates are to be dissolved in water having appreciable salinity, such as water containing more than about 0.5 percent by weight of a soluble salt, it has been found advantageous first to dissolve the petroleum sulfonates in fresh water to prepare a more concentrated solution and then to dilute the solution with the water having the appreciable salinity. Alternatively, the restricted petroleum sulfonates can be mixed with the saline water and the resulting mixture then heated or aged. In this connection, when an aqueous solution of the restricted petroleum sulfonates is to be employed and is to contain sodium chloride, sodium carbonate, and a soluble inorganic polyphosphate, it is preferred that these salts be added after the solution of the restricted petroleum sulfonates has been prepared.

The quantity of the restricted petroleum sulfonates to be injected in solution into the formation is best expressed in pounds of the restricted petroleum sulfonate per acre foot of formation to be swept by the solution. A quantity of restricted petroleum sulfonates of at least about 200 pounds per acre foot of the formation swept by the solution should be employed. Where the formation is such, because of stratification or otherwise, that the invasion efficiency is less than 100 percent of the pattern sought to be swept by the solution, the quantity of the restricted petroleum sulfonates is reduced proportionately. Thus, if the invasion efficiency in any formation is 30 percent, i.e., the surfactant solution will invade only 30 percent of the volume of the formation in the pattern of flow of the solution between the injection means and the production means, the quantity of restricted petroleum sulfonates will be at least 60 pounds per acre foot of the total volume of the formation. Ordinarily, a total amount of the restricted petroleum sulfonates of from about 600 to about 4,000 pounds per acre foot of the formation swept by the solution is adequate. Any combination of quantity of solution and concentration of the restricted petroleum sulfonates which will give the described quantities for subterranean formations will be satisfactory.

Any finite concentration of the restricted petroleum sulfonates in the solution may be employed. Stated otherwise, employing solution containing the restricted petroleum sulfonates in any finite concentration will help in displacing oil within the subterranean formation. Ordinarily, however, a concentration of at least about 0.01, and no more than about 25, percent by weight of the restricted petroleum sulfonates should be employed in the solution.

With any solution of the restricted petroleum sulfonates, the higher molecular weight petroleum sulfonates tend to be absorbed onto the surfaces of the subterranean formation more readily than the lower molecular weight petroleum sulfonates. Accordingly, at least in the first portion of the solution of restricted petroleum sulfonates injected into the formation, it is preferred that the restricted petroleum sulfonates contain a greater proportion of higher molecular weight petroleum sulfonates than lower molecular weight petroleum sulfonates. Thus, as an example, in connection with the previously described specific embodiment of the invention where the restricted petroleum sulfonates are obtained by admixing higher molecular weight petroleum sulfonates with lower molecular weight petroleum sulfonates, the solution of the restricted petroleum sulfonates may contain, in at least the first portion to be injected into the formation, about 1 to about 25 percent by weight of petroleum sulfonates having molecular weights as high as 590 and having a median molecular weight of from about 410 to about 450 and containing about 0.0002 to about 15 percent by weight of petroleum sulfonates having molecular weights as low as 290 and having a median molecular weight of from about 340 to about 380.

Where an aqueous solution is employed, and it is to contain sodium chloride, sodium carbonate, and a soluble inorganic polyphosphate, it is preferred that the concentration of sodium chloride be from about 0.01 to about 2 percent by weight, the concentration of sodium carbonate be from about 0.02 to about 0.2 percent by weight, and the concentration of soluble inorganic polyphosphate be from about 0.02 to about 0.2 percent by weight. Concentrations of sodium chloride above about 2 percent by weight are to be avoided since the petroleum sulfonates are chemically incompatible with sodium chloride in concentrations above about 2 percent by weight.

Ordinarily, the solution is employed in a slug of from about 0.01 to about 0.2 pore volume of the formation invaded by the solution. When a hydrocarbonaceous solution is followed by an aqueous solution, the volume of the hydrocarbonaceous solution will be from about one-tenth to about equal to the volume of the aqueous solution. The total volume of the two solutions will also be from about 0.01 to about 0.2 pore volume.

The following examples will be further illustrative of the invention.

EXAMPLES 1-8

These first eight examples are given by way of background information to demonstrate the interfacial tensions and the contact angles which can be obtained by employing conventional commercially available mixtures of petroleum sulfonates in the interface between a water phase and an oil phase.

In each example, an oil-water system was set up wherein an oil phase was placed in contact with a water phase. The oil phase was degassed crude oil obtained from the Upper Upper Loma Novia Sand of the Upper Eocene, Loma Novia Field, Duval County, Tex. The temperature in the Upper Upper Loma Novia Sand is about 116° F. (46.6° C.), at which temperature the degassed crude oil has a viscosity of approximately 4.4 centipoises. The oil also has a density at 77° F. of 0.901 gram per cubic centimeter and a density of 116° F. of 0.890 gram per cubic centimeter. The water phase was ground water available in the vicinity of the Loma Novia Field for injecting into a subterranean formation. The water contained sodium chloride in the amount of 1.1 percent by weight. The water also contained various other components and an analysis of the water is given in Table V.

TABLE V

| Component: | Quantity (parts per million) |
|---|---|
| $CO_3^{--}$ | 0 |
| $HCO_3^-$ | 1,382 |
| $SO_4^{--}$ | 0 |
| $Cl^-$ | 6,057 |
| $Ba^{++}$ | 0 |
| Fe, dissolved | 0 |
| Fe, total | 2.8 |
| $Ca^{++}$ | 28 |
| $Mg^{++}$ | 8 |
| $Na^+$ (flame) | 4,500 |
| Total dissolved solids | 11,020 |

Specific gravity, 1.009.
pH, 7.7.

The interfacial tension and the contact angle between the oil and the water phases were measured for each of these systems. These measurements were made using the sessile drop method. In this method, a drop of one phase, i.e., the oil phase, is caused to advance and recede on a level surface, such as a quartz or Teflon surface in an essentially infinite body of the opposite phase, i.e., water. The vertical and horizontal dimensions of the drop afford a measure of the interfacial tension. The angle at which the leading edge of the drop contacts the solid surface is the contact angle. This contact angle directly indicates the degree of wettability of the solid surface. Slightly different values of interfacial tension and contact angle sometimes result from the measurements carried out when the drop is advancing as compared with when the drop is receding. The measurements here were carried out when the drop was advancing.

The results obtained are set forth in Table VI. In this table, the first horizontal column gives the example number. The second horizontal column gives the components in the aqueous phase on the basis of weight percent of the aqueous phase. The third and fourth horizontal columns give, respectively, the interfacial tension in dynes per centimeter and the contact angle in degrees.

oil from a formation. The contact angle, however, was 180 degrees.

TABLE VI

| Example No | 1 | 2 | 3 | 4 | 5 | 6 | 7 | 8 |
|---|---|---|---|---|---|---|---|---|
| Components contained in system, wt. percent: | | | | | | | | |
| Alconate 80 | | 0.001 | 0.1 | 0.01 | 0.01 | | | |
| Pyronate 50 | | | | | | 0.1 | 0.1 | 0.1 |
| Sodium chloride | 1.1 | 1.1 | 1.1 | 1.1 | 1.1 | 1.1 | 1.1 | 1.1 |
| Sodium carbonate | | | | 0.05 | 0.05 | | 0.05 | 0.05 |
| Sodium tripolyphosphate | | | | | 0.1 | | | 0.10 |
| Interfacial tension, dynes/centimeter | 6.80 | 6.60 | 0.048 | 0.094 | 0.039 | 0.035 | 0.041 | 0.027 |
| Contact angle, degrees | 160 | 170 | 180 | 157 | 180 | 170 | 154 | 180 |

It will be observed from Table VI that the 0.001 weight percent of the Alconate 80 in Example 2 reduced the interfacial tension only slightly, and increased the contact angle, from the values in Example 1. Increasing the amount of the Alconate 80 to 0.1 weight percent in Example 3 affected a considerable decrease in the interfacial tension although it was still high from the standpoint of recovery of oil from a subterranean formation. An increase in the contact angle to 180 degrees was obtained. In Example 4, the 0.01 weight percent of the Alconate 80 and the 0.05 weight percent of the sodium carbonate effected a decrease in interfacial tension and contact angle over that obtained in Example 1. In Example 5, where the only difference in the components in the system over Example 4 was the 0.01 weight percent of sodium tripolyphosphate, the interfacial tension was decreased still further but was still high from the standpoint of recovery of oil from a subterranean formation. However, the contact angle was increased to 180 degrees. In Example 6, the addition of the 0.1 weight percent of the Pyronate 50 effected a decrease in the interfacial tension over that obtained in Example 1 but the value was still high for recovery of oil from a subterranean formation. The contact angle was increased over that in Example 1. In Example 7, the 0.05 weight percent of the sodium carbonate along with the 0.1 weight percent of the Pyronate 50 increased the interfacial tension and decreased the contact angle over the values obtained in Example 6. In Example 8, the 0.1 weight percent of tripolyphosphate along with the 0.1 weight percent of Pyronate 50 and the 0.05 weight percent of sodium carbonate decreased the interfacial tension to the lowest value obtained in the eight examples, namely, 0.027 dyne per centimeter. Nevertheless, this value of the interfacial tension is still high from the standpoint of recovery of

EXAMPLE 9

This example illustrates the low interfacial tension between a water phase and an oil phase which can be effected with the restricted petroleum sulfonates.

In this example, a number of systems similar to those described in Examples 1–8 were prepared. The same crude oil and the same water containing 1.1 percent by weight of sodium chloride were employed as in the previous examples. In each system, however, the water contained dissolved therein added sodium carbonate in the amount of 0.025 to 0.05 weight percent and added sodium tripolyphosphate in the amount of 0.05 to 0.1 weight percent. The water in each system also contained dissolved therein restricted petroleum sulfonates.

The restricted petroleum sulfonates were obtained by mixing Pyronate 50 and Alconate 80. As indicated previously, these commercially available petroleum sulfonates contain 50 percent and 80 percent by weight, respectively, of the petroleum sulfonates. These were mixed together in the proportion of between 0.32 and 0.96 part by weight of Pyronate 50 to 1 part by weight of Alconate 80. On the basis of the petroleum sulfonates contained in these commercially available petroleum sulfonates, the petroleum sulfonates of the Pyronate 50 were thus mixed in the proportion of 0.2 to 0.6 part by weight to 1 part by weight of the petroleum sulfonates of the Alconate 80. The resulting mixtures of the commercially available petroleum sulfonates had a median molecular weight of 391 to 406 and molecular weights between 289 and 587, but less than 10 percent of the mixtures had a molecular weight below 290 and less than 15 percent of the mixtures had a molecular weight above 590. The mixtures were dissolved in the aqueous phase of each of the systems in amounts such that the concentration of the petroleum sulfonates of the Alconate 80 was 0.008 percent by weight of the aqueous phase.

The interfacial tension between the oil and the water in each of the systems was then measured employing the method employed in the previous examples. The results of these measurements are given in FIGURE 1.

Figure 1:
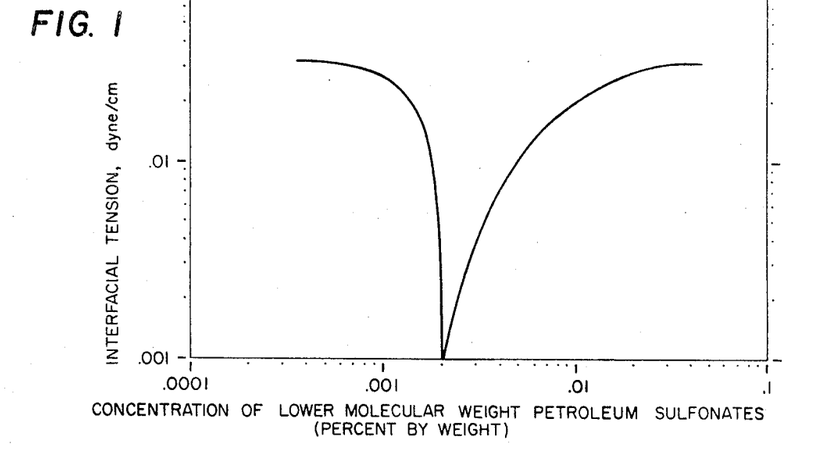
FIGURE 1 is a graph illustrating the unusually low interfacial tension effected between water and oil by employing the restricted petroleum sulfonates.

In FIGURE 1, the ordinate is the measured interfacial tension in dynes per centimeter and the abscissa is the concentration of the restricted petroleum sulfonates dissolved in the aqueous phase. The concentration of the restricted petroleum sulfonates is expressed in terms of the concentration, in percent by weight, of the petroleum sulfonates of the Pyronate 50 dissolved in the aqueous phase. It will be observed from FIGURE 1 that in each instance, the interfacial tension obtained was less than 0.03 dyne per centimeter. It will be further observed from FIGURE 1 that a minimum interfacial tension of 0.001 dyne per centimeter was obtained with a concentration of the petroleum sulfonates from the Pyronate 50 of 0.002 weight percent, the concentration of the petroleum sulfonates from the Alconate 80, as mentioned previously, being 0.008 weight percent. Thus, a minimum interfacial tension for these systems was obtained with a proportion of the petroleum sulfonates from the Alconate 80 to the petroleum sulfonates from the Pyronate 50 of 4 to 1 and a total concentration of restricted petroleum sulfonates in the aqueous phase of 0.01 weight percent.

The contact angle between the aqueous phase and the oil phase in each one of these instances was also measured. In each instance the contact angle was 180 degrees.

EXAMPLE 10

This example will be further illustrative of the interfacial tensions obtained employing the restricted petroleum sulfonates prepared by mixing commercially available petroleum sulfonates.

In this example, a plurality of systems similar to those described in Example 9 were prepared. The same crude oil and the same water were employed as in Example 9 and the water contained dissolved therein, along with the 1.1 percent by weight of sodium chloride, added sodium carbonate and added sodium tripolyphosphate in the same amounts as in this previous example. The water also contained dissolved therein restricted petroleum sulfonates prepared by mixing Pyronate 50 and Alconate 80. The Pyronate 50 and the Alconate 80 were mixed together in the proportions of about 0.55 to about 0.008 part by weight of the Pyronate 50 to 1 part by weight of the Alconate 80, these proportions being based upon the petroleum sulfonates contained in each. The amount of the restricted pertoleum sulfonates dissolved in the water in each system was such that the concentration of the Alconate 80, on the basis of the petroleum sulfonates, was 0.04 percent by weight of the water. The interfacial tension between the water and the oil was then measured by the same method as in the previous examples.

The interfacial tension in each system was less than 0.01 dyne per centimeter.

EXAMPLE 11

This example will also illustrate the extent to which the interfacial tension between water and oil may be reduced employing the restricted petroleum sulfonates.

A system was prepared similar to those prepared in Example 10. The same oil and water were employed and the water contained dissolved therein, along with the 1.1 percent by weight of sodium chloride, the same concentrations of added sodium carbonate and sodium tripolyphosphate as in the previous example. However, there were dissolved in the water restricted petroleum sulfonates prepared by mixing 1 part by weight of Pyronate 50 to 4 parts by weight of Alconate 80, these proportions being on the basis of the petroleum sulfonates contained in each. The median molecular weight was 404. The resulting mixture was dissolved in the water in the amount such that the concentration of the Alconate 80, on the basis of the petroleum sulfonates, was 0.04 percent by weight of the solution.

The interfacial tension between the oil and the water was measured as in the previous examples and the interfacial tension was 0.0003 dyne per centimeter.

EXAMPLE 12

This example will be further illustrative of the interfacial tensions obtained between an oil and a water employing the restricted petroleum sulfonates.

A plurality of systems similar to those described in the previous examples were set up employing the same oil and the same water. The water contained dissolved therein, along with the 1.1 percent by weight of sodium chloride, added sodium carbonate in the amount of 0.025 to 0.05 percent by weight and added sodium tripolyphosphate in the amount of 0.05 to 0.1 percent by weight. The water also contained dissolved therein various restricted petroleum sulfonates in various concentrations. These restricted petroleum sulfonates were prepared by mixing Pyronate 50 and Alconate 80 in various proportions. The interfacial tension between the oil and water in each system was measured. The results obtained are set forth in FIGURE 2.

Figure 2:
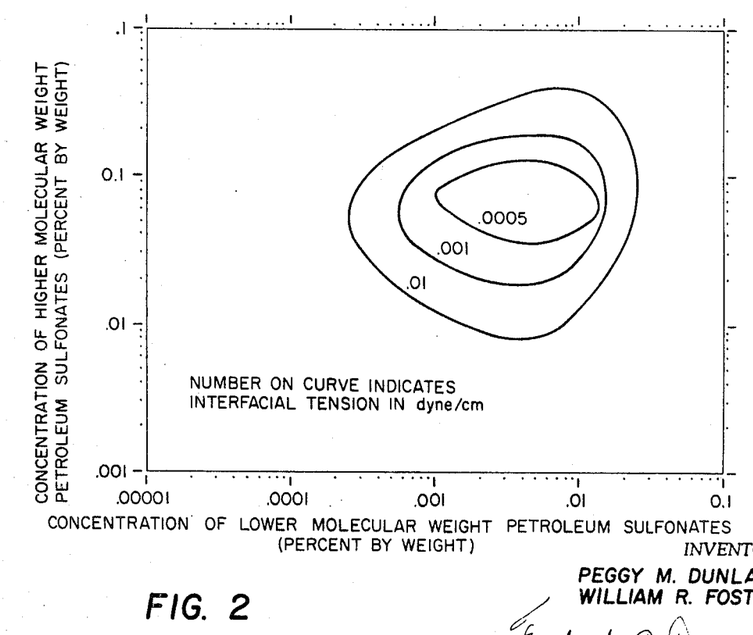
FIGURE 2 is a graph illustrating equitension lines of interfacial tension between water and oil achievable with the restricted petroleum sulfonates.

FIGURE 2 is a graph of equitension lines on a plot of the concentration in the water of the petroleum sulfonates of each of the Pyronate 50 and Alconate 80. The ordinate is the concentration of the Alconate 80 expressed in terms of the concentration in the water of the petroleum sulfonates in the Alconate 80. The abscissa is the concentration of the Pyronate 50 expressed in terms of the concentration in the water of the petroleum sulfonates in the Pyronate 50. Within each of the curves, the concentrations in the water of the petroleum sulfonates in each of the Alconate 80 and the Pyronate 50 effected an interfacial tension no higher than the number within the curve.

It will be observed from FIGURE 2 that an interfacial tension not higher than 0.0005 dyne per centimeter was obtained with a concentration of from about 0.001 to about 0.015 percent by weight of the petroleum sulfonates in Pyronate 50 and a concentration of from about 0.034 to about 0.12 percent by weight of the petroleum sulfonates in Alconate 80 and falling within the 0.0005 dyne per centimeter curve. Similarly, an interfacial tension not higher than 0.001 dyne per centimeter was obtained with a concentration of from about 0.00056 to about 0.016 percent by weight of the petroleum sulfonates in Pyronate 50 and from about 0.019 to about 0.19 percent by weight of the petroleum sulfonates in Alconate 80 and falling within the 0.001 dyne per centimeter curve. Likewise, an interfacial tension not higher than 0.01 dyne per centimeter was obtained with a concentration of from about 0.00024 to about 0.02 percent by weight of the petroleum sulfonates in the Pyronate 50 and from about 0.008 percent to about 0.3 percent by weight of the petroleum sulfonates in the Alconate 80 and falling within the 0.01 dyne per centimeter curve.

EXAMPLE 13

This example is indicative of the effectiveness of the restricted petroleum sulfonates in a waterflooding operation for recovering oil from a subterranean formation.

In this example, a laboratory sand pack containing oil and water and simulating a subterranean formation was employed. The pack was first flooded with water in accordance with conventional procedures to determine the extent to which the oil could be recovered by these procedures. The pack was then subjected to a waterflooding operation employing the restricted petroleum sulfonates, and the amount of oil recovered, in addition to that recovered by the conventional waterflood, was determined. Further, in this example, steps were carried out to minimize adsorption of the petroleum sulfonates on the surfaces of the sand particles and to effect desorption of petroleum sulfonates where adsorption had occurred.

The sand pack was constructed by packing a tube fifty feet long and 0.311 inch in diameter with cleaned sand which had been produced from the Upper Upper Loma Novia Sand. The pack was next evacuated of air and thereafter saturated to 100 percent of the pore volume with the same water, containing the 1.1 percent by weight of sodium chloride, as employed in the previous examples. The pore volume is equal to the volume of water entering the pack during this step. As a next step, the sand pack was flooded with crude oil, the crude oil being the same as employed in the previous examples, by passing the crude oil through the sand pack. Flooding with the crude oil was continued until the oil-water saturation in the sand pack reached equilibrium. Equilibrium was reached when water was no longer being removed from the sand pack by the oil passing through the pack. At this point, the oil saturation of the sand pack was 67 percent, with the water saturation thus being 33 percent.

The sand pack was now flooded with water, as mentioned in the next preceding paragraph, to determine the extent to which the oil could be recovered by waterflooding. To do this, the sand pack was flooded with water by passing the water through the sand pack until the oil-water saturation in the pack reached equilibrium, i.e., until no more oil was being removed from the pack by the passage of the water. The water employed was the same water employed for first saturating the sand pack to 100 percent of the pore volume. This waterflooding recovered 66.4 percent of the oil originally in place.

After the waterflooding described above, the sand pack was subjected to a waterflooding operation employing the restricted petroleum sulfonates. As a first step, an 0.1 pore volume of water was injected, the composition of which was 1.1 percent by weight of sodium chloride, 2.5 percent by weight of sodium carbonate, and 0.5 percent by weight of sodium tripolyphosphate. The purpose of this solution was to minimize subsequent adsorption of the restricted petroleum sulfonates on the surfaces of the solid particles. As a second step, an 0.05 pore volume of solution was injected, similar to that injected in the first step except that the concentrations of sodium carbonate and sodium tripolyphosphate were 0.05 and 0.1 percent by weight, respectively. As a third step, the restricted petroleum sulfonates were injected. This step consisted of passing into the sand pack 0.1 pore volume of the flooding water employed in the previous waterflooding but containing dissolved therein 0.05 percent by weight of sodium carbonate, 0.1 percent by weight of sodium tripolyphosphate, and a mixture of petroleum sulfonates. These inorganic salts, along with the sodium chloride originally contained in the flooding water, occupy adsorption sites on the sand particles and, to the extent that they occupy these sites and are not desorbed therefrom, they reduce the adsorption of the restricted petroleum sulfonates. This aqueous solution contained 1.6 percent by weight of the petroleum sulfonates contained in Alconate 80 and 0.001 percent by weight of the petroleum sulfonates contained in Pyronate 50.

As a fourth step, the sand pack was subjected to a treatment to effect desorption of any of the restricted petroleum sulfonates that may have adsorbed onto the surfaces of the sand particles from the aqueous solution of the petroleum sulfonates just passed into the sand pack. The treatment consisted of passing into the sand pack 0.3 pore volume of an aqueous solution prepared by mixing one part of the water employed for first saturating the sand pack to 100 percent saturation and 3 parts of water substantially the same as tap water, and dissolving therein 0.004 percent by weight of the petroleum sulfonates contained in Pyronate 50, 0.05 percent by weight of sodium carbonate, and 0.1 percent by weight of sodium tripolyphosphate. The petroleum sulfonates contained in Pyronate 50 were added to this solution to supplement the action of the solution of restricted petroleum sulfonates that was passed into the sand pack just preceding this solution. This supplementary action is based upon the fact that higher molecular weight petroleum sulfonates are adsorbed preferentially to lower molecular weight petroleum sulfonates. This solution desorbs the adsorbed higher molecular weight petroleum sulfonates and they dissolve in this solution. Thus, the solution, containing the lower molecular weight petroleum sulfonates, and dissolving the desorbed higher molecular weight petroleum sulfonates, will have contained therein a mixture of petroleum sulfonates which will be the restricted petroleum sulfonates.

As a fifth step, flooding water was passed through the sand pack. This water consisted of one part of the water employed for first saturating the sand pack to 100 percent saturation and 3 parts of water substantially the same as tap water and containing dissolved therein 0.05 percent by weight of sodium carbonate. The flooding water was passed through the sand pack in the amount of 1.5 pore volumes. With the passage of this amount of flooding water, 99 percent of the oil originally in the sand pack was recovered.

Referring to FIGURES 3a and 3b, they illustrate a characterization of an embodiment of the restricted petroleum sulfonates. These restricted petroleum sulfonates were formed by admixing 8 parts by weight of the petroleum sulfonates from Alconate 80 with 0.5 part by weight of the petroleum sulfonates from Pyronate 50.

FIGURE 3a is a frequency distribution curve of the fractions of the restricted petroleum sulfonates having given average molecular weights. In FIGURE 3a, the ordinate is $\Delta$ cumulative weight percent/$\Delta$ molecular weight. The values appearing on the ordinate were obtained by taking the differential amount in weight percent of the restricted petroleum sulfonate between certain molecular weights, dividing this amount by the difference in molecular weights, and plotting the result at the midpoint of the differential molecular weight range. For example, at a molecular weight of 420, the value of $\Delta$ cumulative weight percent/$\Delta$ molecular weight of 2.03 was obtained as follows: A total of 54.5 percent by weight of the restricted petroleum sulfonates had an average molecular weight below 425. A total of 34.2 percent by weight of the restricted petroleum sulfonates had an average molecular weight below 415. The total $\Delta$ cumulative weight percent was thus 20.3 and the $\Delta$ molecular weight was 10.

As can be seen in FIGURE 3a, between the molecular weights of 290 and 590, there is a smooth monomodal frequency distribution curve. The largest portion of the restricted petroleum sulfonates lies between average molecular weights of 360 and 460.

FIGURE 3b shows the cumulative distribution of various molecular weight petroleum sulfonates in the same restricted petroleum sulfonates. The ratio $(M_{90}-M_{10})/M_{50}$ of the restricted petroleum sulfonates graphed in FIGURE 3b equals about 0.27. The total distribution ratio $(M_{100}-M_0)/M_{50}$ equals 0.71.

What is claimed is:

1. In a method of recovering oil from an oil-containing subterranean formation in which flooding water is injected through at least one injection well into said subterranean formation and oil is produced through at least one production well from said subterranean formation to the surface of the earth, the improvement comprising injecting into said formation an aqueous solution containing a mixture of petroleum sulfonates having a median molecular weight of from about 375 to about 430, having molecular weights from 290 to 590, no more than 10 percent by weight thereof having an average molecular weight less than 290, and no more than 15 percent by weight thereof having an average molecular weight more than 590, said aqueous solution also containing sodium chloride, sodium carbonate, and a soluble inorganic polyphosphate.

2. The method of claim 1 wherein said mixture of petroleum sulfonates has a median molecular weight of from about 400 to about 430.

3. The method of claim 1 wherein said sodium chloride is in a concentration of from about 0.01 to about 2 percent by weight of said aqueous solution.

4. The method of claim 1 wherein said sodium carbonate is in a concentration of from about 0.02 to about 0.2 percent by weight of said aqueous solution.

5. The method of claim 1 wherein said polyphosphate is either sodium tripolyphosphate or tetrasodium pyrophosphate and is in a concentration of from about 0.02 to about 0.2 percent by weight of said aqueous solution.

6. The method of claim 1 wherein said mixture of petroleum sulfonates is in a concentration of from about 0.01 to about 25 percent by weight of said aqueous solution.

7. The method of claim 1 wherein said mixture of petroleum sulfonates is injected in an amount of at least 200 pounds per acre foot of a pattern from which oil is to be recovered within said subterranean formation.

8. The method of claim 7 wherein said mixture of petroleum sulfonates is injected in an amount of from about 600 to about 4,000 pounds per acre foot of said pattern in said subterranean formation.

9. The method of claim 1 wherein said mixture of petroleum sulfonates is prepared by mixing higher molecular weight petroleum sulfonates having molecular weights as high as 590 and having a median molecular weight of from about 410 to about 450, and lower molecular weight petroleum sulfonates having molecular weights as low as 290 and having a median molecular weight of from about 340 to about 380.

10. The method of claim 9 wherein said higher molecular weight petroleum sulfonates are contained in said solution in a concentration of from about 1 to about 25 percent by weight and said lower molecular weight petroleum sulfonates are added to said solution in a concentration of from about 0.0002 to about 15 percent by weight.

11. The method of claim 1 wherein said solution contains from about 1 to about 25 percent by weight of higher molecular weight petroleum sulfonates characterized in Table II as having a median molecular weight of about 418, having molecular weights as high as 590, of which about 6.5 percent by weight have an average molecular weight of about 373, and of which about 12.9 percent by weight have an average molecular weight of about 587 and contains from about 0.0002 to about 15 percent by weight of lower molecular weight petroleum sulfonates characterized in Table I as having a median molecular weight of about 346, having molecular weights as low as 290, of which about 7.4 percent by weight have an average molecular weight of about 289, and of which about 7.1 percent by weight have an average molecular weight of about 438.

12. The method of claim 11 wherein said solution contains 1.6 percent by weight of said higher molecular weight petroleum sulfonates and 0.001 percent by weight of said lower molecular weight petroleum sulfonates.

13. The method of claim 1 wherein said solution is injected into said subterranean formation in an amount from about 0.01 to about 0.2 pore volume.

14. The method of claim 13 wherein said solution is a hydrocarbonaceous solution of said mixture of said petroleum sulfonates and is followed by an aqueous solution of said petroleum sulfonates.

15. The method of claim 14 wherein said hydrocarbonaceous solution of said petroleum sulfonates is in a volume of from about one-tenth to about equal to the volume of said aqueous solution of said petroleum sulfonates.

16. The method of claim 1 wherein said mixture of petroleum sulfonates is formed by admixing in requisite proportions lower molecular weight petroleum sulfonates characterized in Table I as having a median molecular weight of about 346, having molecular weights as low as 290, of which about 7.4 percent by weight have an average molecular weight of about 289, and of which about 7.1 percent by weight have an average molecular weight of about 438 with either (1) higher molecular weight petroleum sulfonates characterized in Table II as having a median molecular weight of about 418, having molecular weights as high as 590, of which about 6.5 percent by weight have an average molecular weight of about 373, and of which about 12.9 percent by weight have an average molecular weight of about 587, (2) higher molecular weight petroleum sulfonates characterized in Table III as having a median molecular weight of about 421, having molecular weights as high as 590, of which about 9.6 percent by weight have an average molecular weight of about 350, and of which about 13.5 percent by weight have an average molecular weight of about 577, or (3) higher molecular weight petroleum sulfonates characterized in Table IV as having a median molecular weight of about 427, having molecular weights as high as 590, of which about 7.5 percent by weight have an average molecular weight of about 356, and of which about 14.6 percent by weight have an average molecular weight of about 570.

17. The method of claim 16 wherein said requisite proportions are from about 0.008 to about 0.55 part by weight of said lower molecular weight petroleum sulfonates to each part by weight of said higher molecular weight petroleum sulfonates.

18. The method of claim 1 wherein said aqueous solution of said petroleum sulfonates contains a concentration of from about 0.00056 to about 0.016 percent by weight of lower molecular weight petroleum sulfonates having distribution of molecular weights as low as 290 and having a median molecular weight of from about 340 to about 380, from about 0.019 to about 0.19 percent by weight of higher molecular weight petroleum sulfonates having distribution of molecular weights as high as 590 and having a median molecular weight of from about 410 to about 450, from about 0.025 to about 0.05 percent by weight sodium carbonate, and from about 0.05 to about 0.1 percent by weight sodium tripolyphosphate.

19. The method of claim 1 wherein a hydrocarbonaceous solution of said mixture of petroleum sulfonates is also injected into said subterranean formation.

References Cited

UNITED STATES PATENTS

| | | | |
|---|---|---|---|
| 2,808,109 | 10/1957 | Kirk | 166—42 |
| 2,839,466 | 6/1958 | Shock et al. | 166—42 X |
| 3,191,676 | 6/1965 | Froning | 166—9 |
| 3,258,071 | 6/1966 | Yu Shen et al. | 166—9 |
| 3,288,213 | 11/1966 | King et al. | 166—9 |
| 3,297,084 | 1/1967 | Gogarty et al. | 166—9 |
| 3,302,713 | 2/1967 | Ahearn et al. | 166—9 |
| 3,332,486 | 7/1967 | McGhee | 166—9 |
| 3,348,611 | 10/1967 | Reisberg | 166—9 |
| 3,361,313 | 1/1968 | Riggs et al. | 166—9 |
| 3,373,808 | 3/1968 | Patton | 166—9 |

STEPHEN J. NOVOSAD, Primary Examiner

UNITED STATES PATENT OFFICE
CERTIFICATE OF CORRECTION

Patent No. 3,468,377                            September 23, 1969

Peggy M. Dunlap et al.

It is certified that error appears in the above identified patent and that said Letters Patent are hereby corrected as shown below:

Column 3, line 25, "watar" should read -- water --. Column 4, line 57, "$(M_{90} \approx M_{10})$" should read -- $(M_{90}-M_{10})$ --. Column 6, line 63, "10.2" should read -- 10.0 --. Column 7, line 7, "hydrocarbon" should read -- hydrocarbons --. Column 9, line 45, "affected" should read -- effected --. Columns 9 and 10, TABLE VI, sixth column, line 5 thereof, "0.1" should read -- 0.01 --.

Signed and sealed this 5th day of May 1970.

(SEAL)
Attest:

Edward M. Fletcher, Jr.                      WILLIAM E. SCHUYLER, JR.
Attesting Officer                                      Commissioner of Patents